(12) United States Patent
Lópz Jimenez

(10) Patent No.: US 6,320,279 B1
(45) Date of Patent: Nov. 20, 2001

(54) UNINTERRUPTED ELECTRIC POWER SUPPLY SYSTEM

(76) Inventor: Miguel López Jimenez, Edificio Europa Carretera Fuencarral-Alcobendas, km., 15,700 28108 Alcobendas (Madrid) (ES)

( * ) Notice: Subject to any disclaimer, the term of this patent is extended or adjusted under 35 U.S.C. 154(b) by 0 days.

(21) Appl. No.: 09/171,160
(22) PCT Filed: Apr. 11, 1997
(86) PCT No.: PCT/ES97/00089
  § 371 Date: Apr. 23, 1999
  § 102(e) Date: Apr. 23, 1999
(87) PCT Pub. No.: WO97/39511
  PCT Pub. Date: Oct. 23, 1997

(30) Foreign Application Priority Data

Apr. 12, 1996 (ES) .................................................. 9600840

(51) Int. Cl.[7] .................................................. H02J 9/08
(52) U.S. Cl. .............................................. 307/64; 307/68
(58) Field of Search ................................. 290/43, 52, 54, 290/1 R; 307/64–68

(56) References Cited

U.S. PATENT DOCUMENTS

| 1,982,315 | * | 11/1934 | Lundberg . | |
|---|---|---|---|---|
| 3,675,112 | | 7/1972 | Smith . | |
| 4,208,590 | * | 6/1980 | Blomquist et al. | 290/1 R |
| 4,208,592 | | 6/1980 | Leibow et al. . | |
| 4,260,902 | * | 4/1981 | Crider | 290/54 |
| 4,302,683 | * | 11/1981 | Burton | 290/52 |
| 4,827,152 | | 5/1989 | Farkas . | |
| 5,373,198 | * | 12/1994 | Lopez Jimenez | 307/68 |
| 5,519,267 | * | 5/1996 | Pentecost | 290/54 |

FOREIGN PATENT DOCUMENTS

| 1438690 | 1/1969 | (DE) . |
|---|---|---|
| 1488924 | 8/1969 | (DE) . |
| 2010860 | 2/1989 | (ES) . |
| 2261778 | 5/1993 | (GB) . |

* cited by examiner

*Primary Examiner*—Fritz Fleming
(74) *Attorney, Agent, or Firm*—Klauber & Jackson

(57) ABSTRACT

The uninterrupted electric power supply system of the present system includes: a control means(5); a synchronous machine (1) having an electric motor means (1M) and an alternator means (1A), the electric motor means being arranged to be fed by the network (10), and the electric motor means (1M) being mechanically connected to the alternator means (1A) to provide energy to the alternator means while they receive electric energy from the network (10); a first mechanical energy supply means having an internal combustion engine (2) arranged to provide mechanical energy to the synchronous machine (1) under the control of the control means (5), the internal combustion engine (2) being connected to the synchronous machine by means of first mechanical coupling means (8); a second mechanical energy supply means, connected to the synchronous machine by means of second mechanical coupling means (9) in such a way that they can provide mechanical energy to the synchronous machine (1) under the control of the control means (5); and, a pressurized fluid accumulation means the fluid being gaseous or liquid.

15 Claims, 8 Drawing Sheets

UNINTERRUPTED ELECTRIC POWER SUPPLY SYSTEM

OBJECT OF THE INVENTION

The present invention refers to a system to allow the electric energy supply to be maintained in the case of variations or interruptions of the electric power supply in a public or private electric supply network, the system also including means to compensate overloads.

BACKGROUND OF THE INVENTION

Spanish patent applications ES-A-8900495 (corresponding to British patent application GB-A-2229329) and ES-A-9102561 (corresponding to British patent application GB-A-2261778) describe systems that comprise a synchronous machine that comprises electric motors and alternator means. Normally, the motor means are fed from the network. The systems also comprise an internal combustion engine, for example, a diesel engine, that serves to provide power to the synchronous machine in the event of failure in the network, so that the alternator means can continue feeding a load. Besides, the systems described in said applications comprise a hydraulic motor, that serves to provide energy to the synchronous machine during the time that passes from the detection of a failure in the network until the internal combustion engine can provide necessary power to the synchronous machine. Likewise, the hydraulic motor can serve to start the diesel engine. In ES-A-9102561, the hydraulic motor also serves to compensate overloads.

A disadvantage of the systems described in the above patents, is that the hydraulic motor needs a certain amount of time to start to function and provide the desired power to the synchronous machine, since in an idle state the hydraulic motor remains off in order not to endure any unnecessary wear and to reduce energy consumption. This implies that it may become necessary or convenient to include relatively large inertia flywheels, to ensure that the frequency at the output of the alternator means may be maintained within some specific limits, corresponding to the established tolerance level. These inertia flywheels imply high costs and diverse practical problems, known by an average expert in the field.

DESCRIPTION OF THE INVENTION

The system of the invention is basically comprised of a synchronous machine that carries out the functions of a synchronous electric motor and alternator, coupled by means of coupling means to an internal combustion engine, preferably a diesel engine. Likewise and in addition to the internal combustion engine, the system of the invention includes means to supply energy to the synchronous machine, these means comprising a turbine. Said turbine includes a shaft, a plurality of nozzles, means to convey pressurized fluid from the pressurized fluid accumulation means to the nozzles, and means to release pressurized fluid in such a way that the fluid is expelled through the nozzles. The nozzles are placed in such a way that the expulsion of fluid through them provides turning torque to the shaft. Besides, the system includes the pressurized fluid accumulation means and control means (preferably, electronic means). The control means include means to control the expulsion of fluid by the nozzles. The pressurized fluid may be liquid or gaseous, for example, compressed air.

Preferably, all the elements of the system are mounted on a frame.

Preferably, the synchronous machine is coupled to a inertia flywheel or to a plurality of inertia flywheels.

The power of the internal combustion engine can correspond to the nominal power of the system. The synchronous machine may comprise one or several alternators, each one corresponding to a galvanically independent circuit that is to be kept fed.

In the case that there are several alternators, they are mechanically connected to one another and, optionally, to an inertia flywheel. The alternators may be connected by means of rigid couplings between their shafts, or by means of flexible couplings. As to the inertial flywheel, it may have reduced dimensions in comparison to flywheels of previous systems, due to the inclusion of the turbine. The flywheel may be coupled to the synchronous machine by means of higher speed gears.

The coupling means between the internal combustion engine and the synchronous machine are preferably comprised of a freewheeling type clutch.

As to the turbine, it corresponds to a reaction turbine, which seems to be especially advantageous when very powerful systems (typically of more than 800 kVA) are involved. In this case, the nozzles turn with the shaft of the turbine and they serve to accelerate the pressurized fluid to maintain the turning speed of the synchronous machine within the established limits. These nozzles that are positioned radially to the tangential output of the pressurized fluid, receive the flow from the pressurized fluid accumulation means through the above mentioned duct means. In the case of operation by reaction or by reaction/action, the nozzles accelerate the pressurized fluid that can be supplied to the turbine by the radial ducts from a central part that surrounds the shaft of the turbine and that comprises a ball joint. The shaft of the turbine can be integral to the shaft of the synchronous machine or it may connected to it by means of rigid or elastic couplings or even by gears at different speeds. The central part may receive a flow of pressurized fluid when the pressurized fluid release means are activated, for example, upon a series connected valve between said central part and the pressurized fluid accumulation means being electrically activated.

Above all when the linear speeds of the rotating nozzles are high, the reaction effects suffice in principle. This may correspond to systems with a diameter in the range of 1.5 to 2 meters. (The diameter corresponds to the diameter of the imaginary circle passing through the nozzles).

Normally, the diameters are proportional to the powers of the systems.

The pressurized fluid release and accumulation means (for example, compressed air) are essentially comprised of at least one high pressure compressor, at least one high pressure accumulation tank, at least one fluid flow control valve, as well as ducts that connect the valve, compressor, as well as the high pressure fluid tank(s) together.

Operation of the pressurized fluid release valve, although electrically controlled, can be carried out by means of a servomechanism that receives pressurized fluid from a low pressure drum, that communicates with the high pressure fluid tank through a pressure reducer.

As to the control means, preferably electronic control means, two aspects, namely, power and control are distinguished.

With regard to power control, when the public or private network correctly supplies electric energy, the system, namely, the synchronous machine, receives electric energy through reactor means, that may be comprised of an inductance. Advantageously, the reactor means may be connected between first switching means, located between the reactor means and the network, and third switching means, located between the reactor means and the synchronous machine. The synchronous machine may be connected by said third switching means and through the second switching means, to the load, the second switching means being located in series between the reactor means and the load. If the system includes a plurality of alternators, they may be coupled by means of the corresponding switching means to the respective loads, namely, the respective electric energy consumers that are to be protected. The voltage to the load is the correct one produced by the corresponding alternator, for example by the synchronous machine. This absorbs energy from the network, through the reactor means, and acts as a rotating autotransformer, using the same winding, thanks to the voltage that drops in said reactor means.

Preferably, so that the system can be disconnected from the network, when revision, maintenance or repair work of the system in the absence of electric current must be carried out, fourth switching means by means of which the load can be connected directly to the network, when the system is disconnected from the network by means of third switching means, are provided for.

With regard to the control of the system, this is done by control means, preferably comprised in a central control unit connected separately to sensor means respectively of the turning speed of the synchronous machine and of the internal combustion engine, as well as detecting means of relevant variables of the electric network. The central control unit controls the system by sending electric operating signals to the different switching means, to speed adjustment means of the internal combustion engine, to starting and stopping means of the internal combustion engine, to voltage adjustment means of the alternator, to the excitation regulator of the alternator to correct the power factor of the overall electric installation, to the pressurized fluid bypass valve, to means that start and stop the compressor and optionally to a preheating device of the internal combustion engine. The control means receive information from sensors that measure different parameters, for example, the turning speed of the synchronous machine and the speed of the internal combustion engine.

Basically, it could be said that the control comprises two concepts, namely, main actions and secondary actions.

The main actions comprise the starting up of the turbine at the right moment, in order to ensure the speed of the synchronous machine at all times. During the absence of the network, the turbine acts as a support to the internal combustion engine, compensating the insertion of new loads and/or overloads. When a failure is produced in the network, the turbine serves to maintain the speed of the synchronous machine, until the internal combustion engine has started and acquired its nominal speed.

For this purpose, it is necessary to measure the turning speed of the synchronous machine, which can be done, for example, with a magnetic pickup on a toothed wheel. The control means can be programmed in such a way that upon detecting a 0.25% reduction of the nominal speed in the turning speed of the synchronous machine, operation of the turbine is ordered, opening the pressurized fluid release means. By means of said servomechanism, the turning speed can be maintained within some limits in the neighborhood of +/−1% (depending, of course, on the inertia of the unit).

Secondary actions refer to electric automatisms of absence and return of the network, of maintenance by-pass, of preheating of the internal combustion engine, of the starting of the same, of stopping, automatic reloading of the pressure vessels (accumulators), of the informative elements of the internal combustion engine, of the information of the electric variables, etc.

In the presence of electric power supplied by the public or private network, by means of the system of the invention the conditioning of the values of voltage received from the load in such a way that said voltage does not exceed some specific limits, preferably ±2% in stationary rating and ±8% in transitory rating (less than 150 milliseconds) is achieved, whatever the value of the input voltage of the network is. In presence of the network and in the chosen power electric configuration, the synchronous machine receives its electric energy supply from said network in such a way that it maintains its turning movement by means of the energy that it receives through an inductance series connected to said machine. In this case, the alternator associated to the synchronous machine behaves like a rotating autotransformer and produces in its terminals the nominal voltage required by the load within the desired tolerance limits by means of the adequate selection of the alternator. The vectorial difference between the voltage generated by the alternator and the voltage supplied by the network remains in the terminals of the inductance having this purpose (that may have a value corresponding to approximately one-third the value of the inductance of the alternator). In this way, the efficiency of the electric system is only reduced by the ohmic losses in the material, for example, copper, of the inductance as well as of the windings of the alternator, the losses in both irons of the inductance and of the alternator), aside from some small mechanical losses of the alternator and the ventilation losses of the same. In this way, efficiencies higher than 95%, that is to say, efficiencies that exceed those of the static type systems with batteries, are achieved. Besides, the system according to the invention permits handling of non-linear loads (which is difficult if UPS static converters are used, since they require a considerably oversizing) and the reinjection of harmonic components towards the network is reduced almost in an order of magnitude, in comparison with reinjection in the case of using static rectifiers such as thyristors.

On the other hand, in the absence of the public network electric values essentially similar to the electric values when the network is present, are achieved, aside from maintaining the frequency of about ±1% of the nominal value in a permanent rating, and in a higher limit in a transitory rating (preferably <0.5 seconds) that will depend on the value of the load that has to be fed, and that will influence the specific design characteristics of each technical solution (inertial flywheel ratio/frequency variation margin, etc.).

When an absence of the public network is produced, or either a short circuit close to the input of the system or any other failure in the supply from the network to the synchronous machine, the control means detect a tendency to the reduction of the turning speed of the alternator, by means of the information for this purpose which is supplied by corresponding sensor means (for example, a magnetic pickup.) Upon detecting this tendency, the control means give pertinent instructions to the first switching means to avoid transfer of energy to the network, at the same time that they act on the pressurized fluid release means (for example, air) so that the turbine supplies energy to the synchronous machine. The turbine may be solidly connected to the shaft of the synchronous machine and/or to the inertia flywheel, in such a way that it always turns with the same speed as said shaft, in such a way that in a short lapse of time, the turbine can provide the necessary turning torque to maintain the turning speed of the synchronous machine at the same time that the machine continues transferring suitable energy to the load.

Simultaneously, the control means give instructions to the internal combustion engine so that it can take over the energy supply for the correct operation of the system. Here at least the following operating modes can be contemplated:

The internal combustion engine can be stopped during the normal operation of the system; in which case, when a failure in the network is produced, the control means give an order for the starting up of the engine, which can start up electrically, by means of pressurized fluid (for example, air) and/or hydraulically.

Another possibility consists of leaving the engine in stand-by, for example at 300/500 r.p.m. In this case, the control means give the pertinent instructions to a speed regulator so that the internal combustion engine passes isochronously to the nominal speed.

Another possibility consists of leaving the engine that is in stand by at a speed slightly slower than the nominal speed (but without transferring power to the system); in which case, the control means give pertinent instructions so that the engine isochronously passes to the nominal speed.

Based on these possibilities of operating the internal combustion engine, the system may be designed in different ways, in terms of the results of frequency transients that are to be obtained. Factors that may be taken into account when the operating mode is chosen are, for example, if the maximum frequency stability is needed only for specific moments during the day, if the system does not operate 24 hours a day, if overloads are produced only at specific moments, etc.

The control system permits programming of different operating modes during daily, weekly periods, etc.

The system could also operate temporarily as a cogenerator, for reasons of peak sharing in order to save costs in applying electric rates, for reasons of real installed power (that could be less than the demand at specific moments), or finally due to an interest of billing kW to the electric company.

Once the internal combustion engine has taken over the responsibility of feeding the load, said engine maintains its speed constant thanks to a speed regulator, that can be mechanical or electric. In order to improve the response of the system in the face of sharp changes of load, the regulator can include a sensor module of the current of the alternator, which permits a quicker response of the regulator, maintaining the frequency deviations within a smaller margin in the case of such sharp changes.

Independently from the existence of said current sensor module, the operation of the support system described during the primary absence of the network, is still maintained during the operation of the internal combustion engine as a primary energy source, in such a way that if there is a frequency drop whose descending grade, in the opinion of the control means, were to mean the impossibility of the internal combustion engine from being able to maintain the frequency within tolerable limits, such as in the case of a significant overload, the system would start up, the turbine providing energy to the synchronous machine, in such a way that the speed of the alternator is kept within the correct limits (as long as the power required by the load does not exceed the sum of the power that the turbine and internal combustion engine can provide; for example, 200% of the nominal power that tends to be applied to the load).

The system can be programmed so that the internal combustion engine starts up as long as the speed of the alternator drops, for example, 0.25%; simultaneously the turbine starts up.

When there is an overload in the presence of the network, the only thing that is affected is the voltage value, since the frequency is kept constant although the overload reaches 150%, if this does not last more than a few seconds.

If the overload is very large, or very persistent, the synchronous machine would come out of synchronism, suddenly reducing the turning speed. At that moment, there would be a current overload that would make the synchronous machine disconnect from the network, by means of the first switching means. Then, the turbine and the internal combustion engine would start up.

However, in the absence of network, in other words, under operation of the internal combustion engine, any overload could produce the temporary operation of the turbine to support the system and to maintain the frequency within the desired limits.

In an embodiment of the invention, the control system can be adapted to measure the turning speed of the synchronous machine and the values of the network, as well as to make decisions regarding the actuation of the turbine and of the internal combustion engine based on said measurements, using suitable measuring and calculating means.

Basically, the internal combustion engine starts up when it receives the starting order from the control means. These means can base a starting decision on the measurement, for example, of the following data: Turning speed of the synchronous machine; positive or negative acceleration of the turning of the synchronous machine (calculated by the control means); current intensity in the load; feed current intensity; current intensity of the alternator. The currents are measured to determine the presence or nonpresence of the network.

Based on these measurements, the control means operate in the following manner:

1) In the face of evidence of absence of the network, detected either based on the detection of a reduction of the turning speed of the synchronous machine above a predetermined level or by the information obtained by the electric measurements, the turbine always starts up.

2) As of when the turbine starts up, the control means decide the moment when the internal combustion engine will start up. The control means can be programmed not to give a start up order to the internal combustion engine in the event there is a very short cutoff. For this purpose, in the case of a rapid return of the network after a failure, it is possible that the internal combustion engine does not manage to start up. The waiting time before giving the starting up order may be programmable and it can be placed between, for example, 0 and 60 seconds.

When more than one alternator is used, there is a primary synchronous machine whose power is higher than the sum of powers of the remaining alternators. In this case, the primary synchronous machine acts partially as an engine and transmits mechanical energy to the remaining or secondary alternators. In this case, each one of the secondary alternators feeds a galvanically independent circuit. The secondary alternators can operate at different frequencies than the frequency of the primary synchronous machine, depending on the purposes and loads that have to be fed.

In order to maintain enough fluid (for example, air) in the high pressure fluid tank, the pressurized fluid accumulation means, include a reloading system, that can advantageously be comprised of a motor (preferably an electric motor) that moves a reversible hydraulic fluid pump capable of operating at high pressures. This pump has input and output collecting tubes that are connected to two oil accumulators (a first accumulator and a second accumulator) in such a way that the oil can be pumped between the oil accumulators by the pump.

Each oil accumulator includes a separating membrane, that separates the oil of one space for the other fluid.

The control means of the system measure the pressure in the high pressure fluid tank and control the operation of the pump. The pump actuates when the pressure in said tank is below a predetermined level, and it stops when the pressure exceeds said level; for this purpose, the tank (or tanks) is (are) provided with corresponding pressure sensor means, connected to the control means. The reloading system functions on the basis of drawing in fluid from a fluid inlet (for example, an air inlet), through a filter and on a nonreturn inlet valve, up to the space for fluid of the first oil accumulator, pumping oil from said first accumulator to the second oil accumulator. Upon pumping oil to the second accumulator, the fluid contained in the space for fluid of the second accumulator is forced to come out of said fluid space, by the pressure that the oil exerts, the fluid passing to the high pressure fluid tank (or tanks) through a nonreturn outlet valve.

Subsequently, the cycle is reversed, pumping oil from the second oil accumulator to the first one, drawing in fluid from the fluid inlet and through an nonreturn inlet valve to the second accumulator and forcing the fluid contained in the first accumulator to pass to the high pressure fluid tank, through an nonreturn outlet valve.

The pumping cycles are repeated until the pressure in the high pressure fluid tank reaches a specific level.

The oil accumulators, the high pressure fluid tank, the pressure reducer coupled to the drum and the valve that forms part of the pressurized fluid release means can be interconnected by means of ducts connected to a collector, that may consist of a block, for example a metal block, that has an inside space that communicates with the outside by means of threaded holes, in which the ducts are coupled.

If the reloading system starts up immediately after a failure in the network, the internal combustion engine can be kept operating even after the return of the network, until the reloading system ends the reloading cycle, that is to say, until the pressure in the high pressure fluid tank exceeds the pressure established so that the reloading of the tank stops. The reason why the internal combustion engine is kept operating is that this reduces the risk of the system from not having enough pressure so that the turbine can provide adequate pressure to the synchronous machine, in the event that several consecutive cutoffs are produced.

If atmospheric air is used as the fluid, it must be kept in mind that, given the high pressure to which atmospheric air is subjected, the condensation of the water contained dissolved therein is normally inevitable, therefore it becomes necessary that drainage of the same takes place after each operating cycle of the reloading system. This drainage is produced when air is draw in from the outside, since the nonreturn valve corresponding to the air inlet, opens, letting the water come out by means of bubbling of the air that enters upon creating the depression produced by extraction of the oil from the other side of the membrane of the corresponding accumulator.

Just as it has been indicated above, according to a preferred embodiment of the invention, the internal combustion engine is coupled to the synchronous machine by means of a freewheeling type clutch. This is advantageous, since several systems can thus operate in parallel without the need of including a common control system to ensure that the reverse power phenomenon is not produced, that is to say, to ensure that it cannot happen that an engine receives or absorbs energy from the alternator and, therefore, acts as a brake for the Alternator. Given that the internal combustion engine is coupled to the synchronous machine by means of a freewheeling type clutch, a system according to the present invention can operate in parallel with other identical or similar systems, without equipment being able to accelerate the internal combustion engine of another, and this without common control means. This can be important, since in this way really redundant systems can be made; obviously, a complete redundancy only exists when all the components, even the control means, are independent.

In this sense, it is also possible to couple the turbine to the synchronous machine by means of a freewheeling type clutch.

BRIEF DESCRIPTION OF THE FIGURES

Hereinafter there is a description of an embodiment of the invention based on the following figures.

DETAILED DESCRIPTION OF THE INVENTION

Figure 1:
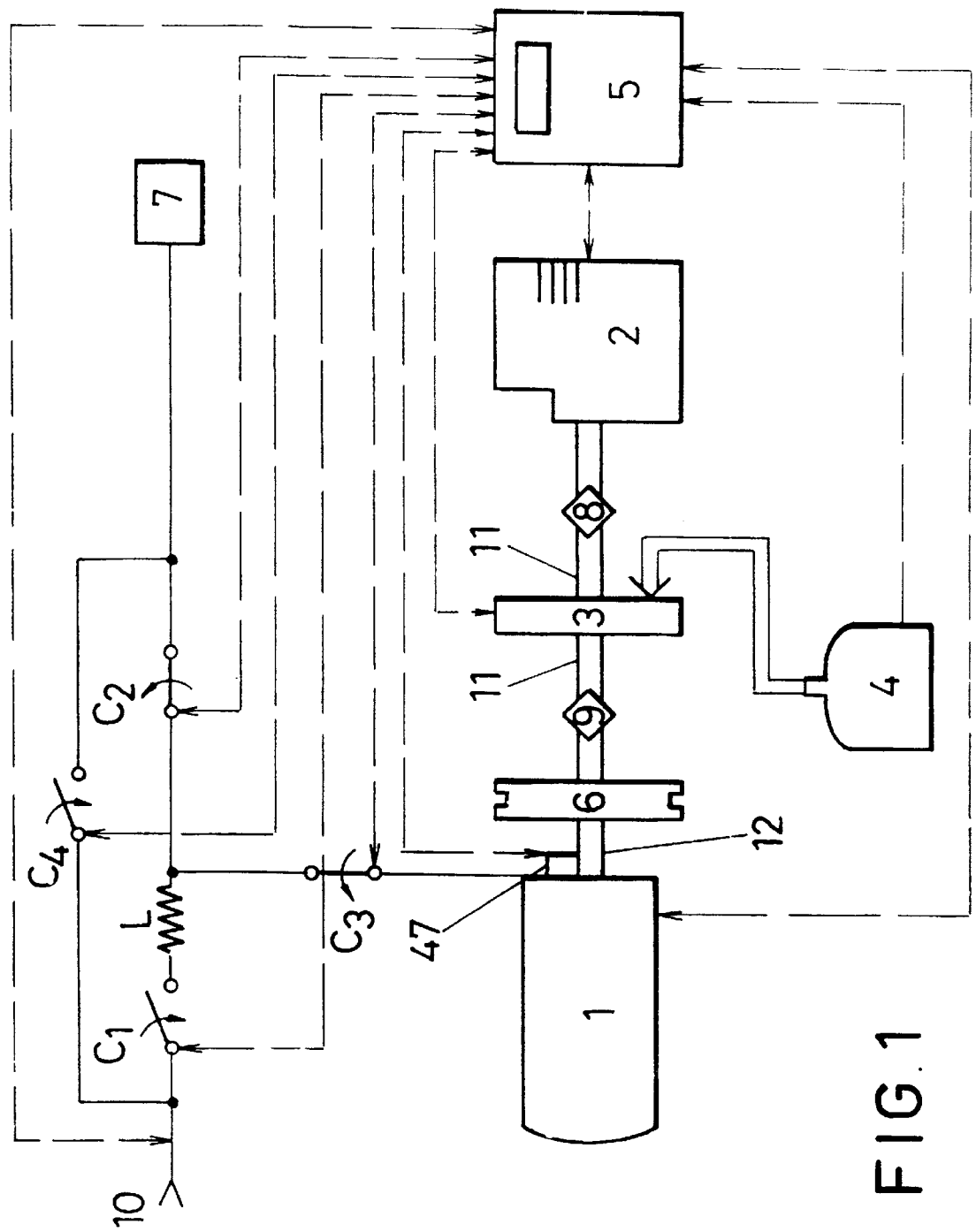
FIG. 1 is a schematic view of the system.

FIG. 1 is a schematic view of the system according to a preferred embodiment of the same, according to which the pressurized fluid is compressed air. The system includes a synchronous machine (1), coupled to an inertia flywheel (6) and to an internal combustion engine (2) (preferably a diesel engine) through first mechanical coupling means (8). These first mechanical coupling means can include a freewheeling type clutch.

The synchronous machine is also coupled to a turbine (3), by means of second mechanical coupling means (9). The turbine (3) is arranged to receive pressurized air from compressed air accumulation means (4). The second mechanical coupling means (9) that interconnect the turbine (3) and the synchronous machine (1) can consist simply of a fixed and solid connection between the shaft (12) of the synchronous machine (1) and the shaft (11) of the turbine (3). In fact, the shaft (11) of the turbine can form part of the shaft (12) of the synchronous machine (1) or of rigid or elastic couplings or even gears at different speeds. As to the inertia flywheel (6), it may be connected fixedly to the shaft (12) of the synchronous machine (1) or, alternately, it may be connected to the synchronous machine (1) by gears at higher speeds. In a possible embodiment, the turbine (3) can be connected fixedly to the inertia flywheel (6).

The system includes control means (5), normally electronic control means.

The synchronous machine is coupled to the network (10), in such a way that, when the public or private network (10)

correctly supplies electric energy, the synchronous machine (1) receives electric energy through reactor means (L), that may be comprised of an inductance. The reactor means (L) can be connected between the first switching means (C1), placed between the reactor means (L) and the network (10) and the third switching means (C3), placed between the reactor means (L) and the synchronous machine (1). The synchronous machine (1) can be connected by means of said third switching means (C3) and by means of the second switching means (C2), to the load (7), the second switching means (C2) being placed in series between the reactor means (L) and the load (7). The voltage to the load is the correct one produced by the synchronous machine (1). This absorbs energy from the network (10), through the reactor means (L) and acts like a rotating autotransformer, using the same winding, thanks to the voltage that falls in said reactor means (L).

So that the system can be disconnected from the network, when the revision, maintenance or repair work of the system have to be carried out in the absence of electric current, fourth switching means (C4), by means of which the load (7) can be connected directly to the network (10), when the system disconnects from the network by means of the third switching means (C3), have been provided for.

Figure 2:
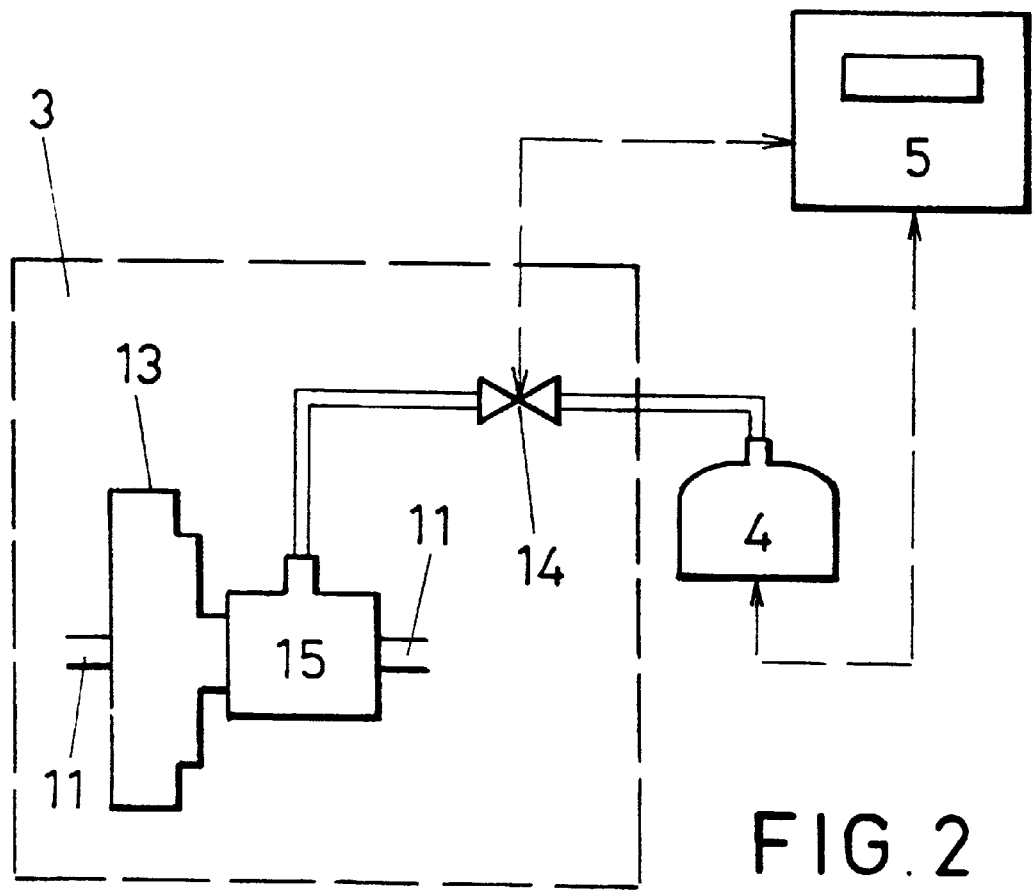
FIG. 2 is a schematic view of the turbine, coupled to the pressurized fluid accumulation means.
Figure 5:
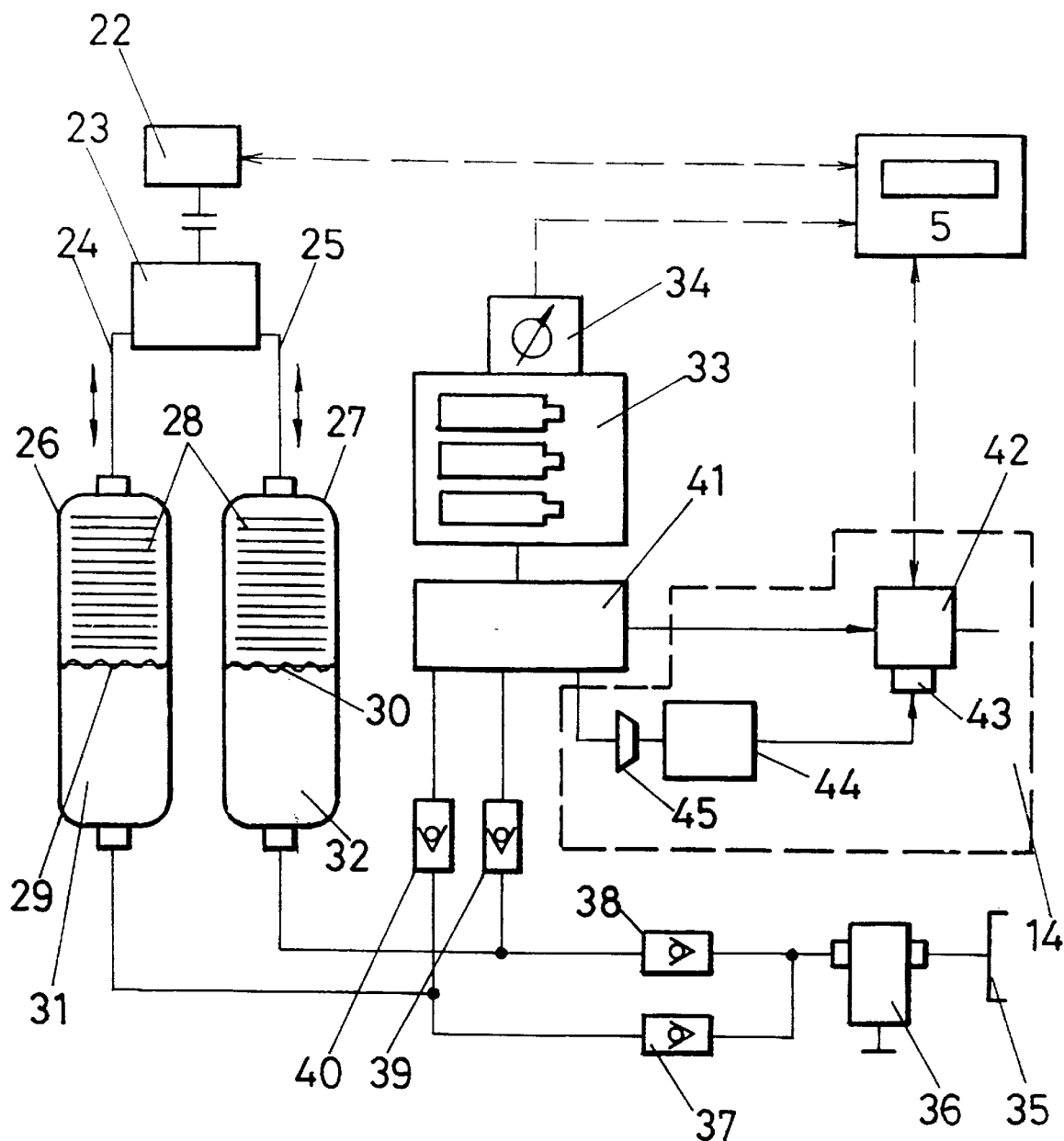
FIG. 5 is a schematic view of the pressurized fluid accumulation means and their connection to the pressurized fluid release means.

The control means (5) are connected to the sensors and actuators related to the different components of the system, illustrating the connections with the dash lines of FIGS. 1, 2 and 5. Among other things, the control means (5) are connected to a pickup (47) of the turning speed of the synchronous machine.

Figure 1A:
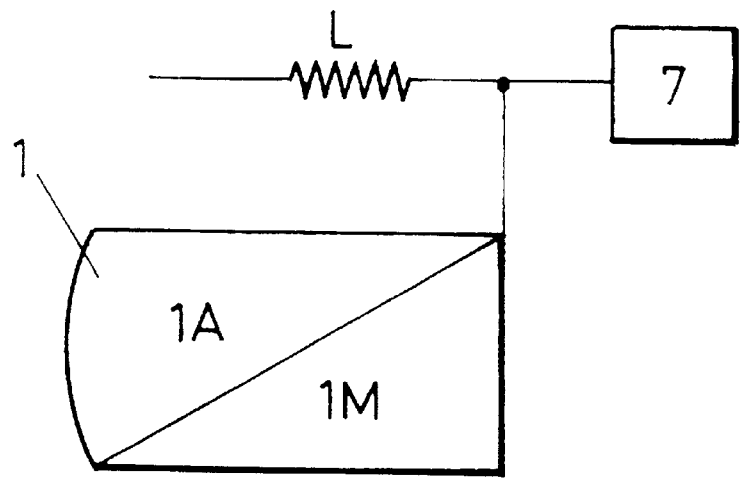
FIG. 1A is a symbolic representation of the division of the synchronous machine into electric motor means and alternator means.

FIG. 1A schematically represents how the synchronous machine comprises electric motor means (1M) and alternator means (1A).

FIG. 2 shows how the turbine (3) includes a shaft (11), a wheel (13) or the like and compressed air release means (14), that can include a valve controlled for example electrically and operated by a pneumatic servomechanism to control the air flow from the compressed air accumulation means (4) to the nozzles of the turbine (not shown in FIG. 2). The turbine includes rotating nozzles. The distribution of air to the nozzles is done by means of a central part (15), that surrounds the shaft (11) of the turbine (3) and that comprises a ball joint.

Figure 3:
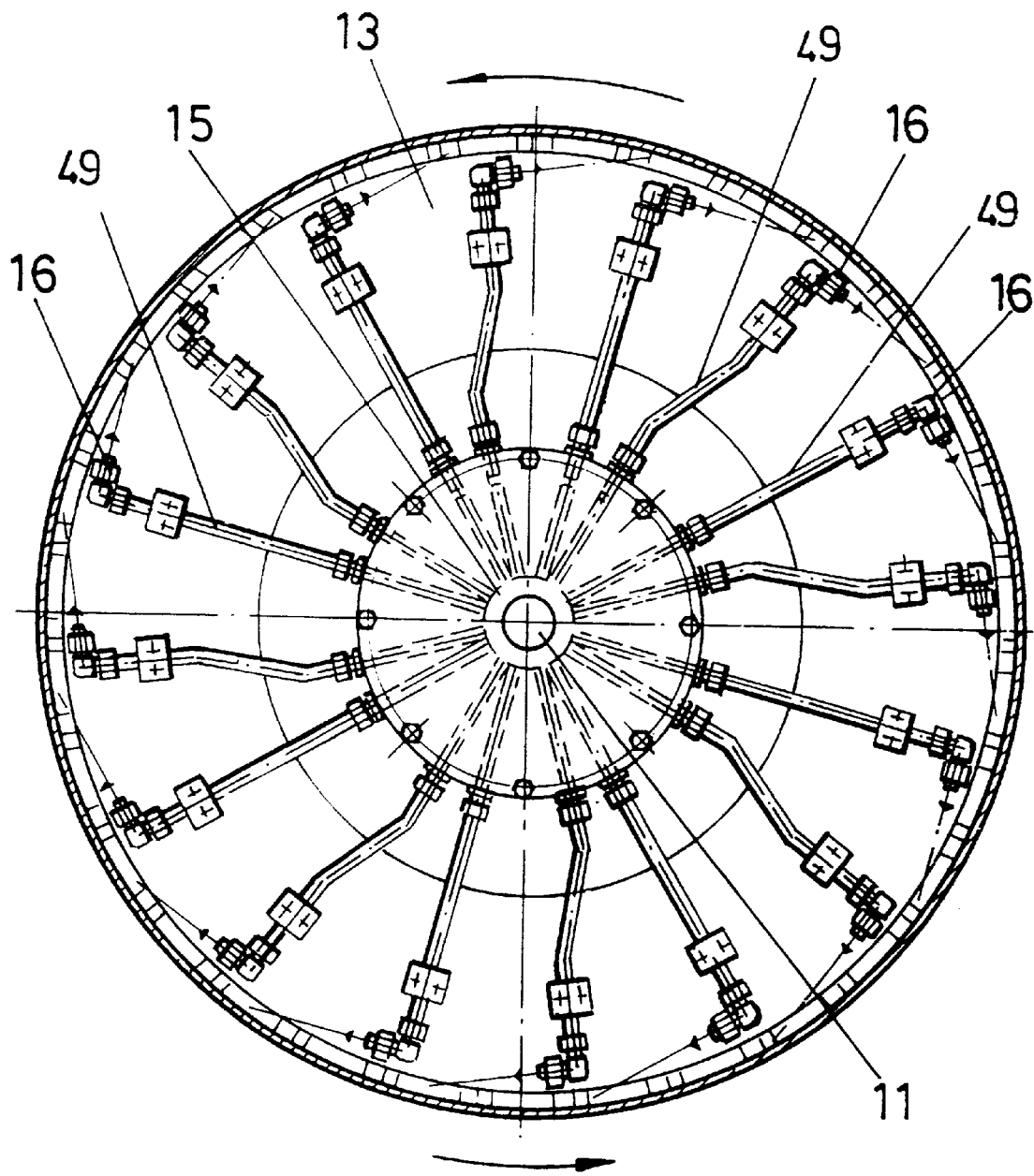
FIG. 3 is a front raised view of the turbine, according to an embodiment of the invention.

FIG. 3 illustrates a turbine (3) with rotating nozzles (16), that receive pressurized air through radial ducts (49) from the central part (15). The central part (15) can receive a pressurized air flow when the compressed air release means (14) are activated, the pressured air flow passing through a valve connected in series between said central part (15) and the compressed air accumulation means (4).

Figure 4A:
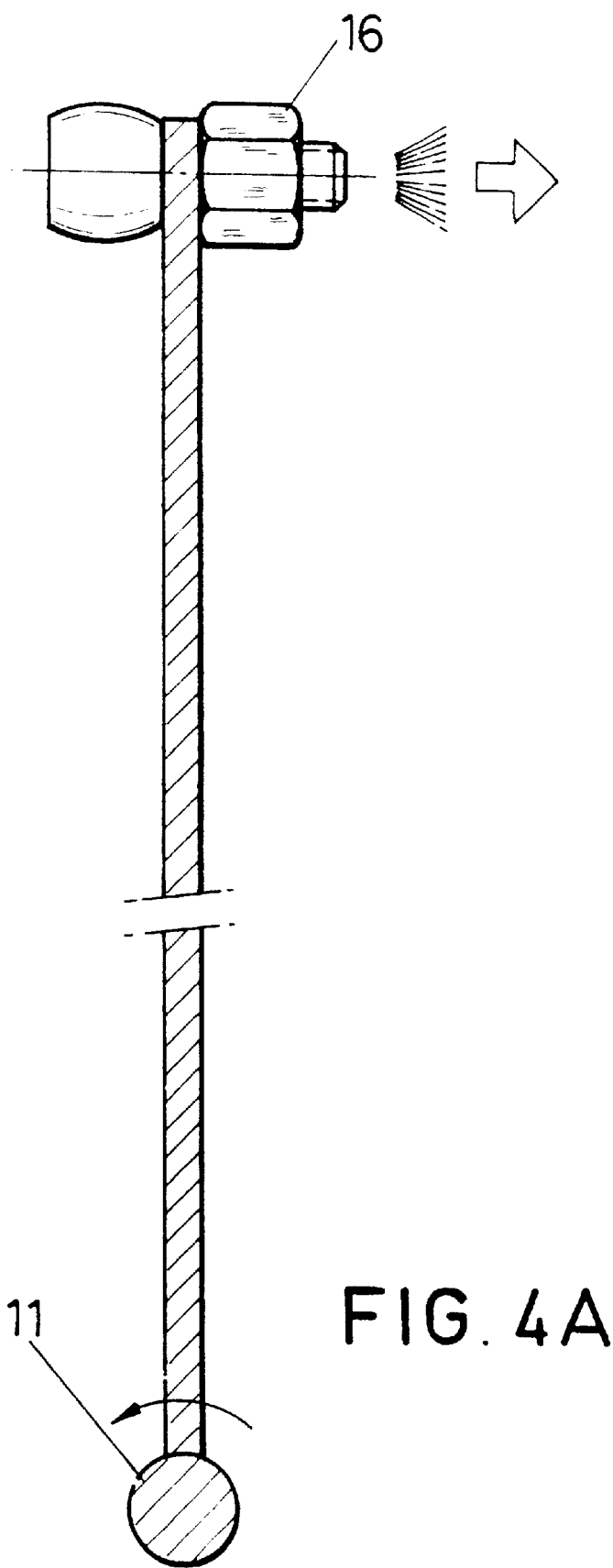
FIG. 4A is a representation of a reaction operating mode.

As to the turbine (3), this corresponds to a reaction turbine (see FIGS. 3 and 4A) The nozzles (16) turn with the shaft (11) of the turbine, and serve to accelerate the pressurized air to maintain the turning speed of the synchronous machine (1) within the established limits. These nozzles (16) that are placed radially to the tangential output of the pressurized air (see FIG. 3), receive the flow from the compressed air accumulation means (4) by the above mentioned duct means.

The nozzles (16) are connected to the shaft (11) in such a way that they turn with the shaft (11), and in such a way that the expulsion of air through the nozzles (16) provides turning torque to the shaft (11) based on a reaction phenomenon.

Above all when the linear speeds of the rotating nozzles are high, in principle it suffices with the reaction effects. This can correspond to systems with diameters of about 1.5 to 2 meters. (The diameter corresponds to the diameter of the imaginary circle passing through the nozzles (16)).

Normally, the diameters are proportional to the powers of the systems.

FIG. 5 schematically illustrates the compressed air accumulation means (4) and their interconnection to the compressed air release means (14). The compressed air accumulation means (4) include a reloading system, that can advantageously be comprised of a motor (22) (preferably an electric motor) that moves a reversible hydraulic fluid pump (23) capable of operating at high pressures. This pump (23) has input and output (24, 25) collecting tubes that are connected to a first oil (28) accumulator (26) and to a second accumulator (27), in such a way that the oil (28) can be pumped between the between the oil accumulators (26, 27) by the pump (23).

Each oil accumulator (26, 27) includes a separating membrane (29, 30) that separates the oil (28) from an air space (31, 32).

The control means (5) of the system measure the pressure in the high pressure air tank (33) and control the operation of the pump (23). The pump (23) operates when the pressure in said high pressure air tank (33) is below a predetermined level, and it stops when the pressures rises above said level; for this purpose, the tank (or tanks) (33) is (are) provided with the corresponding pressure sensor means (34).

The reloading system operates on the basis of drawing in air from an air inlet (35), through a filter (36) and an nonreturn inlet valve (37) up to the air space (31) of the first oil accumulator (26), pumping oil (28) from said first accumulator (26) to the second oil accumulator (27). Upon pumping the oil (28) to the second oil accumulator (27), the air contained in the air space (32) of the second accumulator (27) is forced out of the second accumulator (27), by the pressure that the oil (28) exerts through the membrane (30), the air passing to the high pressure air tank (or tanks) (33) through an nonreturn outlet valve (39).

Subsequently the cycle reverses, pumping oil (28) from the second oil accumulator (27) to the first accumulator (26), drawing in air from the air inlet (35) and through an nonreturn inlet valve (38) up to the second accumulator (27), and forcing the air contained in the first accumulator (26) to pass to the high pressure air tank (33), through an nonreturn outlet valve (40).

The oil accumulators (26, 27), the high pressure air tank (33) and the compressed air release means (14) are interconnected by means of ducts connected to a collector (41), that may consist of a block, for example a metal block, that has an inside space that communicates with the outside through threaded holes, in which the ducts are coupled.

Given the high pressure to which atmospheric air is subjected, condensation of the water contained dissolved in the same is normally inevitable, thus it proves necessary that after each operating cycle of the reloading system, drainage of the same takes place. This drainage is produced when air is drawn in from the outside, since the nonreturn valve (38, 39) corresponding to the air inlet, opens, letting the water come out through the bubbling of the air that enters upon creating the depression generated by the extraction of the oil (28) from the other side of the membrane (29, 30) of the corresponding accumulator (26, 27).

As it can be seen in FIG. 5, the compressed air release means (14) comprise a valve (42), controlled by the control means (5). However, although controlled electrically, the operation of this valve can be done by a pneumatic servomechanism (43), that receives pressurized air from a low pressure drum (44), which communicates with the high pressure air tank (33) through a pressure reducer (45).

Figure 6:
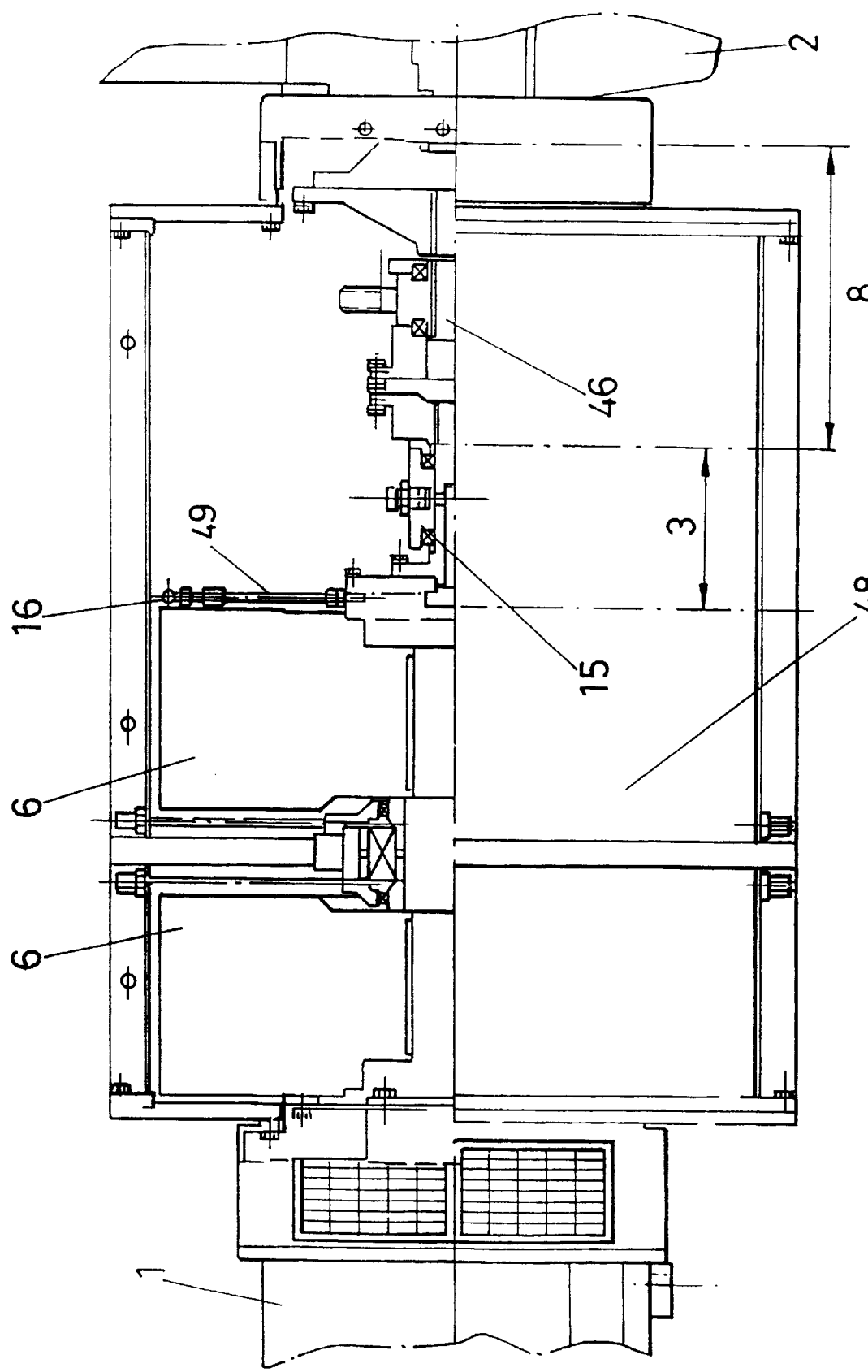
FIG. 6 is a raised side view of a specific embodiment of the system.

FIG. 6 is a side raised view of an embodiment of the present invention, in which one can see the synchronous machine (1), coupled to two inertia flywheels (6) and to the turbine (3) with its central part (15), nozzles (16) and radial ducts (49), all coupled to the internal combustion engine (2) by means of the first mechanical coupling means (8), these means including a freewheeling type clutch (46). The different components of the system are mounted on a frame (48).

The control means (5), preferably comprised in a central control unit, are connected separately to the pickup (47) of the turning speed of the synchronous machine and to the sensor means of the turning speed of the internal combustion engine (2), as well as to detecting means of relevant variables of the electric network (10). The central control unit governs the system by sending electric actuation signals to the different switching means (Cl-C4), to speed adjustment means of the internal combustion engine (2), to starting and stopping means of the internal combustion engine (2), to voltage adjustment means of the alternator, to the excitation regulator of the alternator to correct the power factor of the overall electric installation, to the compressed air release means (14), to the means that start and stop the electric motor (22) of the reloading system, and optionally to a preheating device of the internal combustion engine (2). The channels of transmission of data, orders and information between the control means (5) and the different components of the system are illustrated schematically in FIGS. 1, 2 and 5 (see dash lines).

Basically, it could be said that the control comprises two concepts, namely, main actions and secondary actions.

The main actions correspond to the starting up of the turbine (3) at the suitable moment, to ensure the speed of the synchronous machine (1) at all times. During the absence of the network (10), the turbine (3) acts as a support of the internal combustion engine (2), compensating the insertion of new loads and/or overloads. When a failure is produced in the network (10), the turbine (3) serves to maintain the speed of the synchronous machine (1), until the internal combustion engine (2) has started and acquired its nominal speed.

For this purpose, it is necessary to precisely measure the turning speed of the synchronous machine (1), which may be done by means of the pickup (47), that can be a magnetic pickup on a toothed wheel.

In the moment when an absence of the network (10), or a short circuit close to the input of the system or any other failure in the supply from the network (10) to the synchronous machine (1) is produced, the control means (1) detect a tendency of a drop of a turning speed of the synchronous machine, by means of the information which for this purpose the pickup (47) provides. Upon detecting this tendency, the control means (5) give the pertinent instructions to the first switching means (Cl) to prevent the transfer of energy to the network (10), at the same time that they act on the compressed air release means (14) so that the turbine (3) supplies energy to the synchronous machine (1). The turbine (3) can be solidly connected to the shaft (12) of the synchronous machine (1), in such a way that it always turns at the same speed as said shaft (12), in such a way that in a short lapse of time, the turbine (3) can provide the turning torque needed to maintain the turning speed of the synchronous machine (1) at the same time that the machine continues transferring suitable energy to the load (7).

Simultaneously, the control means (5) give instructions to the internal combustion engine (2) so that the engine can become responsible for the energy supply for the correct operation of the system.

During the primary absence of the network (10), the internal combustion engine is maintained as the primary energy source. If a drop of frequency whose descending grade, in the opinion of the control means (5) were produced, the impossibility of the internal combustion engine (2) to be able to maintain the frequency within tolerable limits would be assumed, as it may happen in the case of a significant overload, the system would start up, the turbine (3) furnishing the synchronous machine (1) with energy, in such a way that the speed of the alternator is kept within the correct limits (as long as the power required by the load (7) does not exceed the sum of the power that the turbine (3) and the internal combustion engine (2) can provide; for example, 200% of the nominal power that is usually applied to the load).

Figure 7:
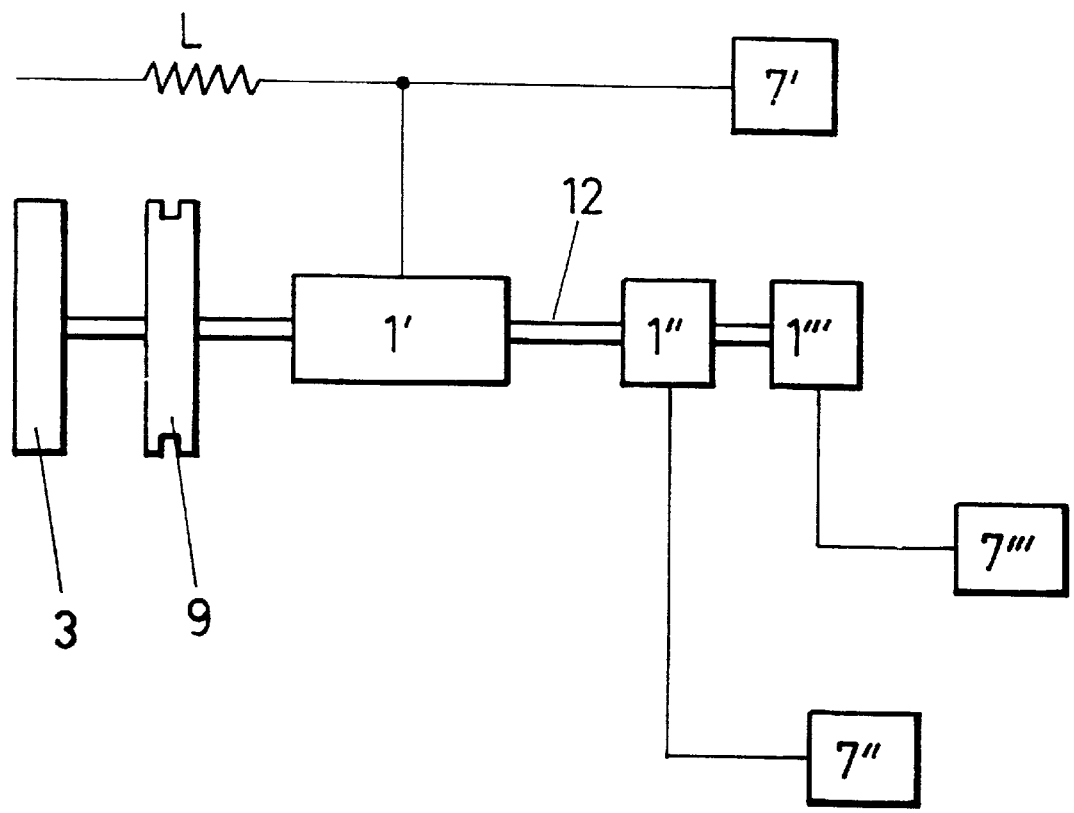
FIG. 7 is a schematic view of a system that comprises a plurality of alternators.

FIG. 7 is a schematic partial illustration of a system according to the present invention, that comprises a plurality of alternators, connected to the same shaft (12) (and to an inertia flywheel (9) and a turbine (3). The system comprises a primary synchronous machine (1') whose power is higher than the sum of the powers of the secondary alternators (1", 1'''). In this case, the primary synchronous machine (1') partially acts as a engine and transmits mechanical energy to the secondary alternators (1", 1'''), and partially as an alternator to feed the corresponding load (7'). In this case, each one of the secondary alternators feeds a galvanically independent circuit with the corresponding loads (7", 7'''). The secondary alternators (1", 1''') can function at frequencies different than the frequency of the primary synchronous machine, depending on the purposes and on the loads (7", 7''') that have to be fed.

Figure 8:
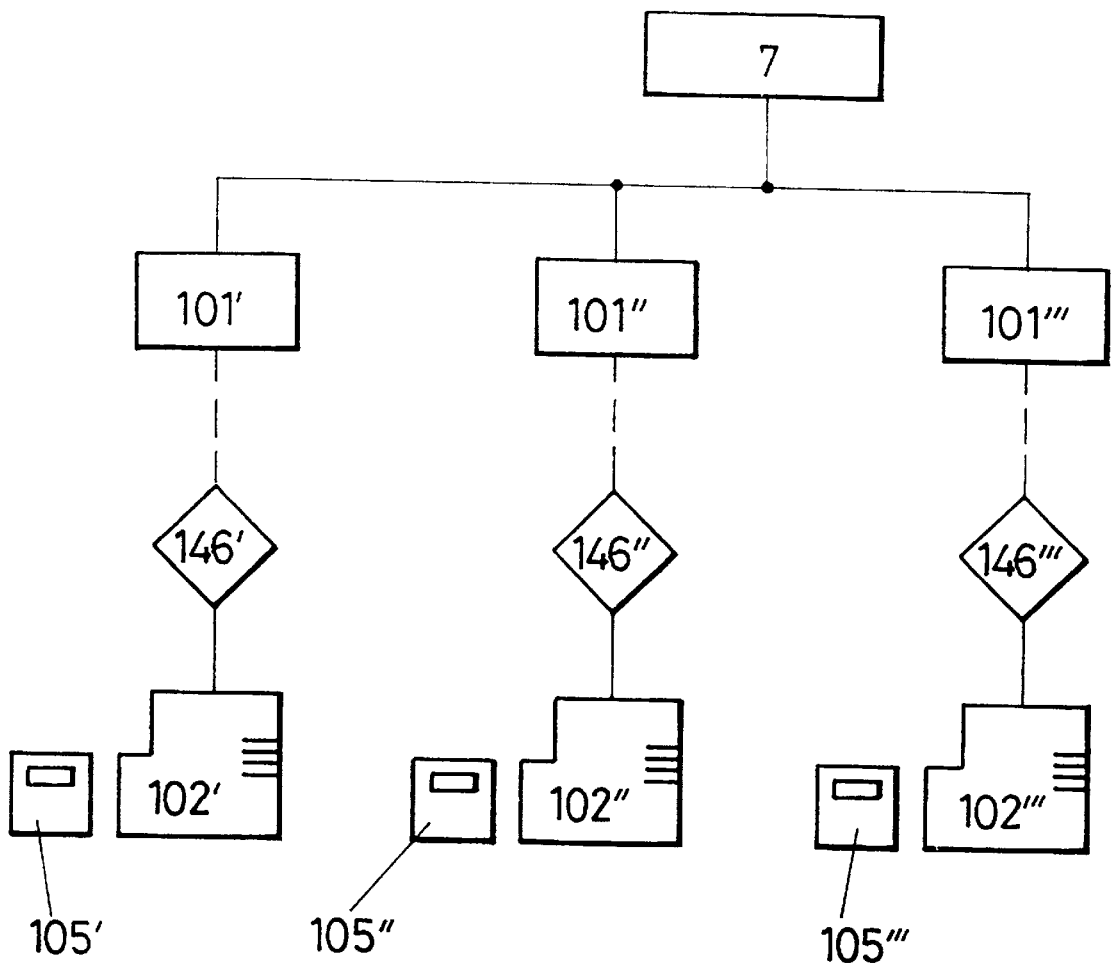
FIG. 8 is a schematic view of a plurality of systems according to the present invention, coupled in parallel.

FIG. 8 is a schematic view of a plurality of systems according to the present invention, coupled in parallel. Since the internal combustion engines (102, 102', 102''') are coupled to the synchronous machines (101, 101', 101") by means of freewheeling type clutches (146, 146', 146"), these systems can operate in parallel without the need to include a common coarol system to assure that no reverse power phenomenon is produced, but rather each system having its own independent control system, based on the corresponding control means (105, 105', 105"). This may be important, since in this way really redundant systems can be made; obviously, complete redundancy only exists when all of the components, including the control means (105, 105',105") are redundant and independent.

In this sense, it is also possible to couple the turbine (3) to the synchronous machine (1) by means of a freewheeling type clutch.

What is claimed is:

1. Uninterrupted electric power supply system, that comprises:
   control means (5);
   a synchronous machine (1) that comprises electric motor means (1M) and alternator means (1A), the electric motor means being arranged to be fed by the network (10), said electric motor means (1M) being mechanically connected to the alternator means (1A) to provide energy to the alternator means while they receive electric energy from the network (10);
   first mechanical energy supply means, that comprise an internal combustion engine (2), arranged to provide mechanical energy to the synchronous machine (1)

under the control of the control means (5), the internal combustion engine (2) being connected to the synchronous machine by means of first mechanical coupling means (8);

second mechanical energy supply means, connected to the synchronous machine by means of second mechanical coupling means (9) in such a way that they can provide mechanical energy to the synchronous machine (1) under the control of the control means (5);

pressurized fluid accumulation means the fluid being gaseous or liquid;

wherein the second mechanical energy supply means are comprised of a turbine (3) that includes a shaft (11), connected to the synchronous machine (1) by means of said second mechanical coupling means (9);

a plurality of nozzles (16);

means to convey pressurized fluid from the pressurized fluid accumulation means to the nozzles (16);

means to release pressurized fluid in such a way that the fluid is expelled through the nozzles (16);

the nozzles (16) being arranged in such a way that the expulsion of fluid through the nozzles (16) provides turning torque to the shaft (11) of the turbine (3);

and wherein the control means (5) include means to control the expulsion of fluid through the nozzles (16); characterized in that the nozzles (16) are connected to the shaft (11) of the turbine (3) in such a way that they turn with said shaft (11), the nozzles (16) being arranged in such a way that the expulsion of fluid through the nozzles (16) provides turning torque to the shaft (11) based on a reaction phenomenon.

2. System according to claim 1, characterized in that the pressurized fluid convey means comprise a rotating distributor formed by a central part (15) that surrounds the shaft (11) of the turbine and radial ducts (49) from said central part (15) up to the nozzles (16), said central part (15) comprising a ball joint.

3. System according to claim 1, characterized in that the nozzles are convergent-divergent nozzles capable of accelerating the fluid to ultrasonic speeds.

4. System according to claim 1, characterized in that it includes at least one inertia flywheel (6) coupled to the shaft (12) of the synchronous machine (1).

5. System according to claim 1, characterized in that it comprises a plurality of alternators (1', 1", 1"') mechanically coupled together, each alternator (1', 1", 1"') corresponding to a galvanically independent circuit that is to be kept fed.

6. System according to claim 1, characterized in that the pressurized fluid release means include at least a valve (42) electrically controlled by the control means (5).

7. System according to claim 1, characterized in that the control means (5) include a pickup (47) to detect the turning speed of the synchronous machine (1), means to detect and indicate a reduction of said speed above a predetermined value as well as means to activate the pressurized fluid release means when said reduction of said speed takes place.

8. System according to claim 7, characterized in that the pickup (47) to detect the turning speed of the synchronous machine (1) includes a magnetic pickup on a toothed wheel.

9. System according to claim 1, characterized in that the synchronous machine (1) is connected to the network by means of a series connection of first switching means (C1), reactor means (L) and third switching means (C1), the first switching means (C1) being located between the reactor means (L) and the network (10), the third switching means (C3) being located between the reactor means (L) and the synchronous machine (1), the synchronous machine being connected to the load (7) by means of said third switching means (C3) and, additionally, by means of the second switching means (C2) located in series between the reactor means (L) and the load (7), the load (7) being coupled directly to the network (10) by means of fourth switching means (C4), located between the network (10) and the load (7), so that the load (7) can connect directly with the network (10).

10. System according to claim 1, characterized in that the pressurized fluid accumulation means include at least one high pressure fluid tank; and a reloading system; the reloading system comprising a fluid inlet;

two oil accumulators (26, 27), each accumulator including a space for oil (28) and another space for fluid, the spaces for oil (28) and the spaces for fluid being separated by corresponding membranes (29, 30);

a motor (22) arranged to operate a reversible hydraulic fluid pump (23), the pump (23) being coupled to the oil accumulators (26, 27) in such a way that upon being operated by the motor (22), the pump (23) pumps oil from an oil accumulator (26, 27) to the other accumulator (27, 26);

the fluid spaces of said oil accumulators (26, 27) being connected to the fluid inlet by means of fluid inlet ducts, and the fluid spaces of said oil accumulators being connected to the high pressure fluid tanks by means of fluid outlet ducts, the fluid inlet ducts having nonreturn inlet valves (37, 38) capable of permitting the flow of fluid in one direction from the fluid inlet to said fluid spaces, and the nonreturn outlet valves (39, 40) having the outlet ducts arranged to permit the flow of fluid in one direction from said fluid spaces up the high pressure fluid tank.

11. System according to claim 10, characterized in that in order to allow automatic drainage of condensed water, the nonreturn inlet valves (37, 38) and the fluid inlet ducts are arranged in such a way that the condensed water can come out through said nonreturn inlet valves (37, 38) as air enters through said nonreturn inlet valves (37, 38).

12. System according to claim 1, characterized in that the internal combustion engine (2) is coupled to the synchronous machine by a freewheeling type clutch (46).

13. System according to claim 1, characterized in that the system includes a plurality of equipment coupled in parallel, each equipment comprising an internal combustion engine (102', 102", 102"') coupled to a corresponding synchronous machine (101', 101", 101"'), and characterized in that the internal combustion engines (102', 102", 102"') are coupled to the correspo nding synchronous machines (101', 101", 101"') by means of freewheeling type clutches (146', 146", 146"'), permitting the operation in parallel of the equipment without common control means and without the risk of the reverse power phenomenon being produced.

14. System according to claim 13 characterized in that the pressurized fluid is gaseous.

15. System according to claim 14, characterized in that the pressurized fluid is compressed air.

* * * * *